United States Patent
Oguchi et al.

(10) Patent No.: US 9,732,466 B2
(45) Date of Patent: Aug. 15, 2017

(54) SUBLIMATION TRANSFER INK SET, DYED PRODUCT AND MANUFACTURING METHOD THEREOF

(71) Applicant: Seiko Epson Corporation, Tokyo (JP)

(72) Inventors: Hideki Oguchi, Fujimi (JP); Yasunari Ikeda, Shiojiri (JP); Shinichi Naito, Chino (JP); Takeshi Yano, Shiojiri (JP); Miho Nakamura, Shiojiri (JP)

(73) Assignee: Seiko Epson Corporation (JP)

( * ) Notice: Subject to any disclaimer, the term of this patent is extended or adjusted under 35 U.S.C. 154(b) by 22 days.

(21) Appl. No.: 15/000,156

(22) Filed: Jan. 19, 2016

(65) Prior Publication Data
US 2016/0208435 A1 Jul. 21, 2016

(30) Foreign Application Priority Data

Jan. 21, 2015 (JP) ................. 2015-009803

(51) Int. Cl.
*C09D 11/328* (2014.01)
*C09D 11/40* (2014.01)
*D06P 1/00* (2006.01)
*D06P 5/28* (2006.01)

(52) U.S. Cl.
CPC .......... *D06P 1/0096* (2013.01); *C09D 11/328* (2013.01); *C09D 11/40* (2013.01); *D06P 5/006* (2013.01)

(58) Field of Classification Search
CPC ..... C09D 11/328; C09D 11/40; D06P 1/0096; D06P 5/006

USPC ....................................... 106/31.27
See application file for complete search history.

(56) References Cited

U.S. PATENT DOCUMENTS

| | | | |
|---|---|---|---|
| 9,222,217 B2* | 12/2015 | Ikeda | C09D 11/328 |
| 9,534,128 B2* | 1/2017 | Oguchi | C09D 11/40 |
| 2008/0193648 A1* | 8/2008 | Becker | C09D 11/30 |
| | | | 106/31.13 |
| 2015/0116418 A1* | 4/2015 | Oura | C09D 11/38 |
| | | | 347/20 |
| 2015/0337152 A1* | 11/2015 | Oguchi | C09D 11/40 |
| | | | 106/31.47 |
| 2015/0337153 A1* | 11/2015 | Oguchi | C09D 11/40 |
| | | | 106/31.44 |
| 2016/0002847 A1* | 1/2016 | Glenat | C09D 11/328 |
| | | | 106/31.47 |
| 2016/0208119 A1* | 7/2016 | Oguchi | C09D 11/328 |
| 2017/0037249 A1* | 2/2017 | Oguchi | D06P 5/006 |

FOREIGN PATENT DOCUMENTS

| | | |
|---|---|---|
| JP | 2010-053197 A | 3/2010 |
| JP | 2015-010212 A | 1/2015 |

* cited by examiner

*Primary Examiner* — Helene Klemanski
(74) *Attorney, Agent, or Firm* — Harness, Dickey & Pierce, P.L.C.

(57) ABSTRACT

Provided is a sublimation transfer ink set including a yellow ink composition containing a yellow dye; a magenta ink composition containing a magenta dye; a cyan ink composition containing a cyan dye; a first black ink composition; and a second black ink composition, in which the first black ink composition contains the yellow dye and the magenta dye, and the cyan dye, and the second black ink composition contains a C.I. disperse blue 360.

12 Claims, No Drawings

SUBLIMATION TRANSFER INK SET, DYED PRODUCT AND MANUFACTURING METHOD THEREOF

BACKGROUND

1. Technical Field

The present invention relates to a sublimation transfer ink set, a dyed product and a manufacturing method thereof.

2. Related Art

Since an ink jet recording method is performed by using a relatively simple device and makes a high definition image possible, it has achieved rapid development in various fields. Various studies have been made regarding image quality and the like of the obtained recorded materials which can be obtained from the above various fields. For example, as a purpose of providing an ink composition which can obtain clear full-color images at high concentrations in such a manner that sublimation transfer paper which is printed without generation of blurring, missing dots, and curved flight has no stickiness during the printing, and a polyester base is hot-pressed so as to remove distortion from a transferred image, JP-A-2010-53197 discloses an ink jet ink for polyester-based sublimation transfer containing at least a sublimating dye, an acetylene glycol-based surfactant, a water-soluble organic solvent, and water, in which the water-soluble organic solvent is formed of three types of glycerines, glycols, and glycol ethers, and in ink, the content of glycerin is within a range of 5 weight % to 30 weight %, the content of the glycols is within a range of 1 weight % to 15 weight %, and the content of the glycol ethers is within a range of 0.1 weight % to 5 weight %.

However, there is a problem in that even with the ink composition disclosed in JP-A-2010-53197, it is difficult to obtain a dyed product having less bleed, high black concentration, and excellent black gradation.

SUMMARY

An advantage of some aspects of the invention is to provide a sublimation transfer ink set which can realize a dyed product having less bleed, high black concentration, and excellent black gradation, a dyed product, and a manufacturing method thereof.

The inventors have intensively studied in order to solve the above problems. As a result, it is found that the above problems can be solved by using a predetermined dye, and therefore, the invention is completed.

That is, the invention is configured as follows.

[1] A sublimation transfer ink set including: a yellow ink composition containing a yellow dye; a magenta ink composition containing a magenta dye; a cyan ink composition containing a cyan dye; a first black ink composition; and a second black ink composition, in which the first black ink composition contains the yellow dye, the magenta dye, and the cyan dye and the second black ink composition contains a C.I. disperse blue 360.

[2] The sublimation transfer ink set according to the above-described [1], in which the yellow dye contains a C.I. disperse yellow 54, the magenta dye contains a C.I. disperse red 60, and the cyan dye contains a C.I. disperse blue 359.

[3] The sublimation transfer ink set according to the above-described [1] or [2], in which among the yellow ink composition, the magenta ink composition, the cyan ink composition, the first black ink composition, and the second black ink composition, and a content of a surfactant of an ink composition of which a main dye has a maximum LogP value that is the same as or less than a content of a surfactant of another ink composition.

[4] The sublimation transfer ink set according to any one of the above-described [1] to [3], in which a difference between a total content of dyes included in the first black ink composition and a total content of dyes included in the second black ink composition is equal to or less than 1.0 mass %.

[5] A method of manufacturing a dyed product, including: attaching each ink composition of the sublimation transfer ink set according to any one of the above-described [1] to [4] to an intermediate transfer medium through an ink jet method; and transferring each dye included in each of the ink compositions to a recoding medium by heating each of the ink compositions in a state where a surface of the intermediate transfer medium to which each ink composition is attached and a dyed surface of the recoding medium face each other.

[6] A dyed product which obtained by using a sublimation transfer ink set according to any one of the above-described [1] to [4].

DESCRIPTION OF EXEMPLARY EMBODIMENTS

Hereinafter, the embodiment of the invention (hereinafter, referred to as "the embodiment") will be described in detail; however, the invention is not limited thereto and can be variously modified within a scope which does not depart from the gist thereof.

Sublimation Transfer Ink Set

The sublimation transfer ink set of the embodiment includes a yellow ink composition containing a yellow dye, a magenta ink composition containing a magenta dye, a cyan ink composition containing a cyan dye, a first black ink composition, and a second black ink composition, and in which the first black ink composition contains the yellow dye, the magenta dye, and the cyan dye, and the second black ink composition contains a C.I. disperse blue 360.

The sublimation transfer ink set of the embodiment contains the first black ink composition which is formed by being mixed with a dye used for color ink, and thus, has excellent black gradation. In addition, the sublimation transfer ink set contains the second black ink composition, and thus, has excellent black concentration. With such a configuration, it is possible to suppress bleed. Yellow ink composition Yellow dye The yellow ink composition contains yellow dye. The yellow dye is not particularly limited; however, examples of the yellow dye include C.I. disperse yellow 3, 4, 5, 7, 9, 13, 23, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 108, 114, 116, 118, 119, 122, 124, 126, 135, 140, 141, 149, 160, 162, 163, 164, 165, 179, 180, 182, 183, 184, 186, 192, 198, 199, 202, 204, 210, 211, 215, 216, 218, 224, 227, 231, and 232. Among these, the C.I. disperse yellow 54 is preferable. There is a tendency that color developing properties are more improved by using such a yellow dye.

The content of yellow dye is preferably 1.0 mass % to 4.0 mass %, more preferably 1.5 mass % to 3.5 mass %, and still more preferably 2.0 mass % to 3.0 mass %, with respect to a total amount of the yellow ink composition. When the content of yellow dye is within the above-described range, there is a tendency to obtain sufficient color development properties of the dyed product while reducing an ejecting amount of the ink.

Surfactant

It is preferable that the yellow ink composition contains a surfactant. The surfactant is not particularly limited; however, examples of the surfactant include an acetylene glycol-based surfactant, an anionic surfactant, and a silicone-based surfactant.

The acetylene glycol-based surfactant is not particularly limited; however, for example, the acetylene glycol-based surfactant is preferably at least one selected from an alkylene oxide adduct of 2,4,7,9-tetramethyl-5-decyne-4,7-diol and 2,4,7,9-tetramethyl-5-decyne-4,7-diol, and an alkylene oxide adduct of 2,4-dimethyl-5-decyne-4-ol and 2,4-dimethyl-5-decyne-4-ol. The commercially available acetylene glycol-based surfactant is not particularly limited; however, examples of the commercial products include olefin 104 series or E series such as olefin E1010 (a product name, Nissin Chemical Industry Co., Ltd.), and Surfynol 465 or Surfynol 61 (a product name, Nissin Chemical Industry Co., Ltd.). The acetylene glycol-based surfactant may be used alone or in combination of two or more types thereof.

The anionic surfactant is not particularly limited; however, examples of the anionic surfactant include alkyl sulfocarboxylate, alkyl diphenyl ether disulfonate, α-olefin sulfonate, polyoxyethylene alkyl ether acetate, N-acylamino acids and salts thereof, N-acyl methyl taurine salt, alkyl sulfate polyoxy alkyl ether sulfate, alkyl sulfate polyoxyethylene alkyl ether phosphate, rosin acid soap, castor oil sulfate, lauryl alcohol sulfate, alkylphenol-type phosphate ester, alkyl-type phosphate ester, alkyl aryl sulfonate, diethyl sulfosuccinate, diethyl sulfosuccinate sulfosuccinate, diethylhexyl sulfosuccinate, dioctyl sulfosuccinate, and the like. The commercially available anionic surfactant is not particularly limited; however, examples of the commercial products include PELEX SS-H and PELEX SS-L (product names, manufactured by Kao Corporation). The anionic surfactant may be used alone or in combination of two or more types thereof.

Examples of the silicone-based surfactant include a polysiloxane-based compound, polyether-modified organosiloxane, and the like. The commercially available silicone-based surfactant is not particularly limited, specifically, BYK-306, BYK-307, BYK-333, BYK-341, BYK-345, BYK-346, BYK-347, BYK-348, and BYK-349 (product names, manufactured by BYK Japan KK), KF-351A, KF-352A, KF-353, KF-354L, KF-355A, KF-615A, KF-945, KF-640, KF-642, KF-643, KF-6020, X-22-4515, KF-6011, KF-6012, and KF-6015, and KF-6017 (product names, manufactured by Shin-Etsu Chemical Co., Ltd.). The silicone-based surfactant may be used alone or in combination of two or more types thereof.

Solvent

The yellow ink composition may contain solvent such as water or a water-soluble organic solvent.

Examples of water include water obtained by removing as many ionic impurities as possible, for example, pure water such as ion exchange water, ultra filtration water, reverse osmosis water, and distilled water, and ultrapure water. In addition, when using water which is sterilized by adding ultraviolet irradiation or hydrogen peroxide, it is possible to prevent the occurrence of mold or bacteria in the case of long-term storage of the ink. With this, there is a tendency that the storage stability is improved.

The content of water is preferably in a range of 50 mass % to 90 mass %, more preferably 55 mass % to 85 mass %, and still more preferably 60 mass % to 80 mass % with respect to a total amount of the yellow ink composition. When the content of water is within the above-described range, the viscosity of the ink can be more easily adjusted, and it can be easily removed after the ejection, the recording material becomes excellent in productivity.

The water-soluble organic solvent is not particularly limited; however, examples of the water-soluble organic solvent include glycols such as ethylene glycol, diethylene glycol, triethylene glycol, polyethylene glycol, propylene glycol, dipropylene glycol, tripropylene glycol, polypropylene glycol, propanediol, butanediol, pentanediol, and hexylene glycol; lower alkyl ethers of glycol such as ethylene glycol monomethyl ether, diethylene glycol monomethyl ether, diethylene glycol monoethyl ether, and diethylene glycol monobutyl ether; glycerine, 2-pyrrolidone, and N-methylpyrrolidone. Among these, glycerine, diethylene glycol, ethylene glycol, ethylene glycol monomethyl ether, diethylene glycol monobutyl ether, propylene glycol, or triethylene glycol monomethyl ether, and triethylene glycol monobutyl ether. In addition, these water-soluble organic solvents can be used alone or in combination of two or more types thereof.

The content of water-soluble organic solvent is preferably 5.0 mass % to 40.0 mass %, more preferably 10.0 mass % to 30.0 mass %, and still more preferably 15.0 mass % to 25.0 mass % with respect to a total amount of the yellow ink composition. When the content of water-soluble organic solvent is within the above-described range, there is tendency to suppress an increase in the viscosity of the ink due to water evaporation in the ink in the vicinity of the nozzle.

Dispersant

The yellow ink composition may contain a dispersant. When the yellow ink composition contains the dispersant, there is a tendency that the dispersion stability of the dye in the yellow ink composition becomes more excellent, and the storage stability of the yellow ink composition, and the ejection stability over the long period perform are also excellent. The dispersant is not particularly limited; however, examples of dispersant include an anionic dispersant, a nonionic dispersant, a polymeric dispersant, and the like.

The anionic dispersant is not particularly limited; however, examples of the anionic dispersant include a formalin condensate of an aromatic sulfonic acid, a formalin condensate of a β-naphthalene sulfonic acid, a formalin condensate of an alkyl naphthalene sulfonic acid, and a formalin condensate of a creosote oil sulfonic acid.

The aromatic sulfonic acid is not particularly limited; however, examples of the aromatic sulfonic acid include an alkyl naphthalene sulfonic acid such as a creosote oil sulfonic acid, a cresol sulfonic acid, a phenolsulfonic acid, a β-naphthol sulfonic acid, a methylnaphthalene sulfonic acid, and a butyl naphthalene sulfonic acid, and a mixture of a β-naphthalene sulfonic acid and a β-naphthol sulfonic acid, a mixture of a cresol sulfonic acid and a 2-naphthol-6-sulfonic acid, and a lignin sulfonic acid.

The nonionic dispersant is not particularly limited; however, examples of the nonionic dispersant include an ethylene oxide adduct of phytosterol and an ethylene oxide adduct of cholestanol.

The polymer dispersant is not particularly limited; however, examples of the polymer dispersant include polyacrylate partial alkyl ester, polyalkylene polyamine, polyacrylate, a styrene-acrylic acid copolymer, and a vinyl naphthalene-maleic acid copolymer.

The content of dispersant is preferably 50 mass % to 200 mass %, and more preferably 100 mass % to 150 mass % with respect to a total amount of the dyes included in the yellow ink composition. When the content of dispersant is within the above-described range, there is a tendency that the dispersion stability of the dye is improved.

Other Components

The yellow ink composition preferably maintains the storage stability and the ejection stability form a head, and thus, in order to improve prevention of clogging, or prevention of deterioration of the ink composition, it is possible to properly add various additives such as a dissolution aid, a viscosity modifier, a pH adjusting agent, an antioxidant, a preservative, an antifungal agent, a corrosion inhibitor, and a chelating agent for capturing metal ions which affect dispersion.

Magenta Ink Composition

Magenta Dye

The magenta ink composition contains a magenta dye. The magenta dye is not particularly limited; however, examples of magenta dye include C.I. disperse reds 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 266, 277, 278, 279, 281, 288, 298, 302, 303, 310, 311, 312, 320, 324, and 328. Among these, the C.I. disperse red 60 is preferable. There is a tendency that a color developing property of the dyed product is more improved by using such a magenta dye.

The content of magenta dye is preferably 4.0 mass % to 8.0 mass %, more preferably 4.5 mass % to 7.0 mass %, and still more preferably 5.0 mass % to 6.0 mass % with respect to a total amount of the magenta ink composition. When the content of magenta dye is within the above-described range, there is a tendency to obtain the sufficient color development property of the dyed product while reducing an ejecting amount of the ink.

Other Components

The magenta ink composition may contain a surfactant, a solvent, a dispersant, and other components. Examples of the surfactant, the solvent, the dispersant, and other components include materials which are the same as those exemplified in the yellow ink composition. The surfactant, the solvent, the dispersant, and other components which are included in the magenta ink composition may be the same as or different from those included in the yellow ink composition. In addition, the contents of the surfactant, the solvent, and the dispersant which are included in the magenta ink composition are within the same range as that described in the yellow ink composition.

Cyan Ink Composition

Cyan Dye

The cyan ink composition contains a cyan dye. The cyan dye is not particularly limited; however, examples of the cyan dye include C.I. disperse blues 3, 7, 9, 14, 16, 19, 20, 26, 27, 35, 43, 44, 54, 55, 56, 58, 60, 62, 64, 71, 72, 73, 75, 79, 81, 82, 83, 87, 91, 93, 94, 95, 96, 102, 106, 108, 112, 113, 115, 118, 120, 122, 125, 128, 130, 134, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 266, 267, 268, 270, 284, 285, 287, 288, 291, 293, 295, 297, 301, 315, 330, 333, 359, and 360. Among these, the C.I. disperse blues 14 and 359 are preferable, and the C.I. disperse blue 359 is more preferable. There is a tendency that a color developing property of the dyed product is more improved by using such a cyan dye.

The content of cyan dye is preferably 3.0 mass % to 7.0 mass %, more preferably 4.0 mass % to 6.0 mass %, still more preferably 4.50 mass % to 5.0 mass % with respect to a total amount of the cyan ink composition. When the content of cyan dye is within the above-described range, there is a tendency to obtain the sufficient color development property of the dyed product while reducing an ejecting amount of the ink.

Other Components

The cyan ink composition may contain a surfactant, a solvent, a dispersant, and other components. Examples of the surfactant, the solvent, the dispersant, and other components include materials which are the same as those exemplified in the yellow ink composition. The surfactant, the solvent, the dispersant, and other components which are included in the cyan ink composition may be the same as or different from those included in the yellow ink composition. In addition, the contents of the surfactant, the solvent, and the dispersant which are included in the cyan ink composition are within the same range as that described in the yellow ink composition.

First Black Ink Composition

Dye

The first black ink composition contains the yellow dye, the magenta dye, and the cyan dye which are described above. Examples of the yellow dye, the magenta dye, and the cyan dye include materials which are the same as dyes exemplified in the yellow ink composition, the magenta ink composition, and the cyan ink composition.

The content of yellow dye is preferably 0.10 mass % to 1.0 mass %, more preferably 0.20 mass % to 0.80 mass %, and still more preferably 0.40 mass % to 0.60 mass % with respect to a total amount of the first black ink composition.

The content of magenta dye is preferably 1.5 mass % to 2.5 mass %, more preferably 1.7 mass % to 2.3 mass %, and still more preferably 1.9 mass % to 2.1 mass % with respect to a total amount of the first black ink composition.

The content of cyan dye is preferably 3.75 mass % to 4.75 mass %, more preferably 3.5 mass % to 4.5 mass %, and still more preferably 3.8 mass % to 4.2 mass % with respect to a total amount of the first black ink composition. When the content of each dye of the yellow dye, the magenta dye, and the cyan dye is within the above-described range, there is a tendency that a black gradation is more improved.

The brightness $L^*$ obtained in the dyed product after the sublimation transfer by using the cyan dye is preferably equal to or greater than 20, more preferably equal to or greater than 24, and still more preferably equal to or greater than 27. When brightness $L^*$ obtained in the dyed product after the sublimation transfer by using the cyan dye is within the above-described range, there is a tendency that a color reproduction range of the dyed product is improved. It is possible to measure the brightness $L^*$ through the method described in examples.

Other Components

The first black ink composition may contain a surfactant, a solvent, a dispersant, and other components. Examples of the surfactant, the solvent, the dispersant, and other components include materials which are the same as those exemplified in the yellow ink composition. The surfactant, the solvent, the dispersant, and other components which are included in the first black ink composition may be the same as or different from those included in the yellow ink composition. In addition, the contents of the surfactant, the solvent, and the dispersant which are included in the first black ink composition are within the same range as that described in the yellow ink composition.

Second Black Ink Composition
Dye

The second black ink composition contains C.I. disperse blue 360, and may include other dyes if necessary. Other dyes are not particularly limited; however, examples of other dyes include the yellow dye; the magenta dye; the cyan dye; an orange dye such as C.I. disperse orange 1, 3, 5, 7, 11, 13, 17, 20, 21, 25, 29, 30, 31, 32, 33, 37, 38, 42, 43, 44, 45, 46, 47, 48, 49, 50, 53, 54, 55, 56, 57, 58, 59, 61, 66, 71, 73, 76, 78, 80, 89, 90, 91, 93, 96, 97, 119, 127, 130, 139, and 142; and a brown dye such as C.I. disperse brown 1, 2, 4, 9, 13, 19, and 27. Among these, it is preferable to include at least one selected from a group consisting of the yellow dye, the orange dye, and the brown dye, and it is more preferable to include at least one selected from a group consisting of the C.I. disperse yellow 54, the C.I. disperse orange 25, and the C.I. disperse brown 27.

The content of C.I. disperse blue 360 is preferably 1.00 mass % to 4.00 mass %, more preferably 1.5 mass % to 3.5 mass %, and still more preferably 2.0 mass % to 3.0 mass %, with respect to a total amount of the second black ink composition. When the content of the C.I. disperse blue 360 is within the above-described range, there is a tendency that the concentration of black is improved while reducing an ejecting amount of the ink.

A lower limit of a difference A between the total content of dyes included in the first black ink composition and the total content of dyes included in the second black ink composition is not particularly limited; however, the difference A is preferably equal to or lower than 1.0 mass %, more preferably equal to or lower than 0.75 mass %, and still more preferably equal to or lower than 0.50 mass %. When the difference A is within the above-described range, there is a tendency that bleed on the recorded material and the dyed product is further reduced.

Other Components

The second black ink composition may contain a surfactant, a solvent, a dispersant, and other components. Examples of the surfactant, the solvent, the dispersant, and other components include materials which are the same as those exemplified in the yellow ink composition. The surfactant, the solvent, the dispersant, and other components which are included in the second black ink composition may be the same as or different from those included in the yellow ink composition. In addition, the contents of the surfactant, the solvent, and the dispersant which are included in the second black ink composition are within the same range as that described in the yellow ink composition.

The content of the surfactant in the ink composition of which the dye having a maximum LogP value is set to be a main dye among the yellow ink composition, the magenta ink composition, the cyan ink composition, the first black ink composition, and the second black ink composition is preferable to be the same as or smaller than the content of the surfactant in other ink composition. Here, the phrase "set to be a main dye" represents the dye which is solely included in the ink composition, or the dye having the maximum content among two or more of the dyes which are included in the ink composition.

Manufacturing Method of Dyed Product

The manufacturing method of the dyed product of the embodiment includes, through the ink jet method, a step of attaching each ink composition of the sublimation transfer ink set to an intermediate transfer medium; and a step of transferring each dye included in each of the ink compositions to a recoding medium by heating each of the ink compositions in a state where a surface of the intermediate transfer medium to which each ink composition is attached and a dyed surface of the recoding medium face each other.

Attaching Step

The attaching step is a step of attaching each ink composition of the sublimation transfer ink set to an intermediate transfer medium through an ink jet method. The discharge of the ink composition through the ink jet method can be performed by using a known ink jet recording apparatus. As a discharging method, it is possible to use a piezo method and a method of discharging ink by using bubbles generated by heating the ink. Among these, in terms of the difficulty of the deterioration of the ink composition, it is preferable to use the piezo method.

Intermediate Transfer Medium

The intermediate transfer medium is not particularly limited; however, examples of the intermediate transfer medium include paper such as plain paper and a recoding medium (referred to as paper for exclusive use, coated paper, and the like) in which an ink receiving layer is provided. Among these, the paper in which the ink receiving layer formed of inorganic fine particles such as silica is provided. With this, it is possible to obtain the intermediate transfer medium on which bleed or the like is suppressed in the process of drying the ink composition which is attached to the intermediate transfer medium, and thereafter, there is a tendency that the sublimation of the dye precedes more smoothly in the transferring step.

Transferring Step

The transferring step is a step of transferring each dye included in each of the ink compositions to the recoding medium by heating each of the ink compositions in a state where a surface of the intermediate transfer medium to which each ink composition is attached and a dyed surface of the recoding medium face each other.

A heating temperature in the transferring step is not particularly limited; however, it is preferable to be within a range of 160° C. to 220° C., and is more preferable to be within a range of 170° C. to 200° C. When the heating temperature is set to be within the above range, there is a tendency that it is possible to more reduce the energy required for the transfer, and the productivity of the dyed products becomes more excellent. In addition, a color developing property of the obtained dyed product is more improved.

The heating time in this step is dependent on the heating temperature; however, the heating time is preferably within a range of 30 seconds to 90 seconds, and more preferably within a range of 45 seconds to 60 seconds. When the heating time is within the above range, there is a tendency that it is possible to more reduce the energy required for the transfer, and the productivity of the dyed products becomes more excellent. In addition, a color developing property of the obtained dyed product is more improved.

In addition, this step can be performed by heating a surface of the intermediate transfer medium to which the ink composition is attached in a state of facing the recoding medium with a certain gap interposed therebetween, and in a state where the intermediate transfer medium and the recoding medium are attached to each other in a tight manner. Among these, the heating is performed in the state where the intermediate transfer medium and the recoding medium are attached to each other in a tight manner. For this reason, there is a tendency that it is possible to more reduce the energy required for the transfer, and the productivity of the dyed products becomes more excellent. In addition, in this step, since it is less likely that the positional deviation of the recoding medium and the intermediate transfer medium is less likely to occur, the dye is more accurately transferred from a desired position so as to obtain a dyed product, and thereby the color developing property of the obtained dyed product is more improved.

Recoding Medium

The recoding medium is not particularly limited; however, examples of the recoding medium include fabric (hydrophobic fiber fabric or the like), a resin (plastic) film, paper, glass, metal, and ceramics. In addition, the recoding medium may be a sheet-like material or a material having a three-dimensional shape such as a spherical shape or a rectangular parallelepiped shape.

In a case where the recoding medium is the fabric, the fiber constituting the fabric is not particularly limited; however, examples of fiber include a polyester fiber, a nylon fiber, a triacetate fiber, a diacetate fiber, a polyamide fiber, and a blend product obtained by combining two or more of them. In addition, a blend product of recycled fibers such as the above fibers and rayon, and natural fibers such as cotton, silk and wool may be used.

In addition, in a case where the recoding medium is a resin (plastic) film, a usable resin (plastic) film is not particularly limited; however, examples of the usable resin film include a polyester film, a polyurethane film, a polycarbonate film, a polyphenylene sulfide film, a polyimide film, and a polyamide-imide film. The resin (plastic) film may be a layered body which is formed of a plurality of layers are layered, and may be formed of a graded material of which the composition of the material is gradient-changed.

Other Steps

In addition to the above-described steps, the manufacturing method of the dyed product of the embodiment may further include other steps (a pre-processing step, an intermediate processing step, and a post-processing step). The pre-processing step is not particularly limited; however, examples of the pre-processing step include a step of coating a coating layer on the recoding medium. The intermediate processing step is not particularly limited; however, examples of the intermediate processing step include a step of pre-heating the recoding medium before an intermediate transferring step or the transferring step. The post-processing step is not particularly limited; however, examples of the post-processing step include a step of cleaning the recoding medium.

In addition, the ink composition of the embodiment is preferably used in the sublimation transfer for which the intermediate transfer medium is not used. The sublimation transfer for which the intermediate transfer medium is not used is not particularly limited; however, examples of the sublimation transfer includes a method of a step of attaching the ink composition of the embodiment to the ink receiving layer of the recoding medium (film product and the like) which is provided with a peelable ink receiving layer through the ink jet method, and a step of heating the recoding medium which is provided with the ink receiving layer to which the ink composition is attached, and sublime-diffusion dyeing the recoding medium of the lower side from the ink receiving layer, and a step of obtaining the dyed product by peeling the ink receiving layer from the recoding medium.

Dyed Product

The dyed product of the embodiment is obtained by using the above-described sublimation transfer ink set.

EXAMPLE

Hereinafter, the invention will be specifically described by using Examples and Comparative Examples. The invention is not limited to the examples described below.

Material for Ink Composition

Main materials for the ink composition which are used in Examples and Comparative Examples below are as follows.

Dye
  DY 54: C.I. disperse yellow 54
  DR 60: C.I. disperse red 60
  DB 359: C.I. disperse blue 359
  DB 14: C.I. disperse blue 14
  DB 360: C.I. disperse blue 360
  DO 25: C.I. disperse orange 25
  DBr 27: C.I. disperse brown 27

Dispersant
  NS: a formalin condensate of a β-naphthalene sulfonic acid

Surfactant
  BYK 348: manufactured by BYK Japan KK, a silicone surfactant)

Water-Soluble Organic Solvent
  GL: glycerine
  TEGMME: triethylene glycol monomethyl ether Preparation of Ink Composition The respective materials were mixed in compositions indicated in Table 1 below, and were sufficiently stirred such that the respective ink compositions can be obtained. Note that, in the below Table 1, a unit of numerical value is mass %, and a total value is 100.0 mass %.

Brightness L*

The brightness L* in a Lab display system which is obtained in the dyed product after the sublimation transfer by using the cyan dye is measured by outputting the ink containing 4 mass % of cyan dye through an ink jet method similar to a black gradation evaluation method, and using a recorded material which is transferred under the same condition. As a result, the value of brightness L* of the C.I. disperse blue 359 is equal to or greater than 27.

Log P Value

The Log P value of each of dyes is calculated based on JIS 7260-107: 2000.

TABLE 1

| | | Composition of sublimation transfer ink | | | | | | | | | | | | |
|---|---|---|---|---|---|---|---|---|---|---|---|---|---|---|
| | Ink | | Sublimation dye material | | | | | | | Dispersant | Surfactant | Organic solvent | | LogP value of |
| Ink type | No. | Water | DY54 | DR60 | DB359 | DB14 | DB360 | DO25 | DBr27 | NS | BYK348 | GL | TEGMME | main dyes |
| Yellow | Y-1 | 83.2 | 2.5 | — | — | — | — | — | — | 2.5 | 0.8 | 8 | 3 | 2.672 |
| Magenta | M-1 | 69.2 | — | 6 | — | — | — | — | — | 6 | 0.8 | 15 | 3 | 3.625 |
| Cyan | C-1 | 72.2 | — | — | 4.5 | — | — | — | — | 4.5 | 0.8 | 15 | 3 | 3.942 |
| | C-2 | 72.2 | — | — | — | 4.5 | — | — | — | 4.5 | 0.8 | 15 | 3 | 2.691 |
| Black | B-1 | 68.2 | 0.5 | 2 | 4 | — | — | — | — | 6.5 | 0.8 | 15 | 3 | 3.942 |
| | B-2 | 68.2 | 0.5 | 2 | — | 4 | — | — | — | 6.5 | 0.8 | 15 | 3 | 2.691 |

TABLE 1-continued

Composition of sublimation transfer ink

| | | | Sublimation dye material | | | | | | Dispersant | Surfactant | Organic solvent | | LogP value of |
| --- | --- | --- | --- | --- | --- | --- | --- | --- | --- | --- | --- | --- | --- |
| Ink type | Ink No. | Water | DY54 | DR60 | DB359 | DB14 | DB360 | DO25 | DBr27 | NS | BYK348 | GL | TEGMME | main dyes |
| | B-3 | 68.2 | 0.5 | — | — | — | 2.5 | 3 | — | 6 | 0.8 | 15 | 3 | 4.64 |
| | B-4 | 68.2 | 0.5 | — | — | — | 2.5 | — | 3 | 6 | 0.8 | 15 | 3 | 4.64 |
| | B-5 | 68.6 | 0.5 | — | — | — | 2.5 | 3 | — | 6 | 0.4 | 15 | 3 | 4.64 |

TABLE 2

| | Y | M | C | First black | Second black | Black concentration | Black gradation | Bleed |
| --- | --- | --- | --- | --- | --- | --- | --- | --- |
| Example 1 | Y-1 | M-1 | C-1 | B-1 | B-3 | A | A | B |
| Example 2 | Y-1 | M-1 | C-1 | B-1 | B-4 | A | A | B |
| Example 3 | Y-1 | M-1 | C-2 | B-2 | B-3 | A | A | B |
| Example 4 | Y-1 | M-1 | C-1 | B-1 | B-5 | A | A | A |
| Comparative Example 1 | Y-1 | M-1 | C-1 | B-1 | — | D | A | B |
| Comparative Example 2 | Y-1 | M-1 | C-1 | — | B-3 | A | C | B |
| Comparative Example 3 | Y-1 | M-1 | C-1 | B-2 | B-3 | A | B | B |
| Comparative Example 4 | Y-1 | M-1 | C-2 | B-1 | B-3 | A | B | B |
| Comparative Example 5 | Y-1 | M-1 | C-1 | B-1 | B-2 | D | A | B |

Black Concentration

The recording was performed at a 1440 dpi×720 dpi of resolution with respect to TRANSJET Classic (manufactured by Cham Paper Group) which is an intermediate transfer medium by using an ink jet printer of SureColor SC-F7000, (manufactured by Seiko Epson Corp.) so as to output the gray scale with 20 gradation patches. Meanwhile, when the maximum ejecting amount of ink was defined as 100% of Duty, 20 gradation was formed from 5% of Duty to 100% of Duty in increments of 5%. At that time, each of the output products was obtained by only using the first black ink composition and the second black ink composition.

Thereafter, the ink adhesion side of the intermediate transfer medium was attached to the fabric which is the white recoding medium (100% of polyester, Amina manufactured by TORAY INDUSTRIES. INC.) in a tight manner, and in this state, the heating was performed at 200° C. for 60 seconds by using a heat press machine (TP-608M, manufactured by Taiyo Seiki Co., Ltd.,) so as to perform the sublimation transfer, thereby obtaining each dyed product.

The OD value of the patch having 100% of Duty of the obtained each dyed product was measured by using a reflection densitometer (Product name: Spectrolino, Gretag Macbeth Company Ltd.). In accordance with evaluation criteria described below, the black concentration was evaluated based on the OD value.

Evaluation Criteria

A: OD value is equal to or greater than 1.60
B: OD value is equal to or greater than 1.58 and lower than 1.60
C: OD value is equal to or greater than 1.56 and lower than 1.58
D: OD value is less than 1.56.

Black Gradation

The recording was performed at the 1440 dpi×720 dpi of resolution with respect to TRANSJET Classic (manufactured by Cham Paper Group) which is the intermediate transfer medium by using the ink jet printer of SureColor SC-F7000, (manufactured by Seiko Epson Corp.) so as to output the gray scale with 20 gradation patches. Meanwhile, when the maximum ejecting amount of ink was defined as 100% of Duty, 20 gradation was formed from 5% of Duty to 100% of Duty in increments of 5%. At that time, after using output data having almost the same colors, an output product 1 which is recorded by using all colors, and an output product 2 which is recorded by using only the first black ink composition were obtained. Meanwhile, the output product 2 which is recorded by using only the second black ink composition was obtained in the ink set does not include the first black ink composition.

Thereafter, the ink adhesion side of the intermediate transfer medium was attached to the fabric which is the white recoding medium (100% of polyester, Amina manufactured by TORAY INDUSTRIES. INC.) in a tight manner, and in this state, the heating was performed at 200° C. for 60 seconds by using a heat press machine (TP-608M, manufactured by Taiyo Seiki Co., Ltd.) so as to perform the sublimation transfer, thereby obtaining each dyed product.

Each color of a* value and b* value of the obtained dyed products were measured by using a color measuring machine (Gretag Macbeth Spectrolino, manufactured by X-Rite, Inc.). In accordance with evaluation criteria described below, the black gradation is evaluated by comparing the a* value and the b* value with the output product 1 and the output product 2.

Evaluation Criteria

A: Δa* or Δb* is greater than 2 or the number of patches are less than 4.

B: Δa* or Δb* is greater than 2 or the number of patches are equal to or greater than 4 and less than 7.

C: Δa* or Δb* is greater than 2 or the number of patches are equal to or greater than 7.

Bleed

The recording was performed at the 1440 dpi×720 dpi of resolution with respect to TRANSJET Classic (manufactured by Cham Paper Group) which is the intermediate transfer medium by using the ink jet printer of SureColor SC-F7000, (manufactured by Seiko Epson Corp.), and the printing was performed such that 10 gradation of the gradation pattern in which the ink ejection amount of the yellow ink composition is changed from 10% to 100% and 10 gradation of the gradation pattern in which the ink ejection amount of the first black ink composition is changed from 10% to 100% directly come in contact with each other, thereby obtaining the intermediate transfer medium. The same intermediate recording medium was obtained by using the second black ink composition instead of the first black ink composition. In addition, the first black ink composition and the second black ink composition formed the same intermediate recording medium by using a magenta ink composition and a cyan ink composition. Note that two sheets were printed for each pattern.

Thereafter, by using the intermediate transfer medium of one of two printed sheets, the ink adhesion side of the intermediate transfer medium was attached to the fabric which is the white recoding medium (100% of polyester, Amina manufactured by TORAY INDUSTRIES. INC.) in a tight manner, and in this state, the heating was performed at 200° C. for 60 seconds by using a heat press machine (TP-608M, manufactured by Taiyo Seiki Co., Ltd.,) so as to perform the sublimation transfer, thereby obtaining each dyed product.

In accordance with evaluation criteria described below, the bleed was evaluated by visually observing the obtained dyed products and the bleed of the intermediate transfer medium after the recording Evaluation Criteria A: In the first black ink composition or the second black ink composition, bleed is not confirmed on both the dyed product and the intermediate transfer medium B: In the first black ink composition or the second black ink composition, bleed is not confirmed on the dyed product, but is confirmed on the intermediate transfer medium.

C: In the first black ink composition or the second black ink composition, bleed is confirmed on both of the dyed product and the intermediate transfer medium.

The entire disclosure of Japanese Patent Application No. 2015-009803, filed Jan. 21, 2015 is expressly incorporated by reference herein.

What is claimed is:

1. A sublimation transfer ink set comprising:
a yellow ink composition containing a yellow dye;
a magenta ink composition containing a magenta dye;
a cyan ink composition containing a cyan dye;
a first black ink composition; and
a second black ink composition,
wherein the first black ink composition contains the yellow dye, the magenta dye, and the cyan dye, and
the second black ink composition contains a C.I. disperse blue 360.

2. The sublimation transfer ink set according to claim 1, wherein the yellow dye contains a C.I. disperse yellow 54, the magenta dye contains a C.I. disperse red 60, and the cyan dye contains a C.I. disperse blue 359.

3. The sublimation transfer ink set according to claim 1, wherein among the yellow ink composition, the magenta ink composition, the cyan ink composition, the first black ink composition, and the second black ink composition, and
a content of a surfactant of an ink composition of which a main dye has a maximum LogP value that is the same as or less than a content of a surfactant of another ink composition.

4. The sublimation transfer ink set according to claim 1, wherein a difference between a total content of dyes included in the first black ink composition and a total content of dyes included in the second black ink composition is equal to or less than 1.0 mass %.

5. A method of manufacturing a dyed product, comprising:
attaching each ink composition of the sublimation transfer ink set according to claim 1 to an intermediate transfer medium through an ink jet method; and
transferring each dye included in each of the ink compositions to a recoding medium by heating each of the ink compositions in a state where a surface of the intermediate transfer medium to which each ink composition is attached and a dyed surface of the recoding medium face each other.

6. A method of manufacturing a dyed product, comprising:
attaching each ink composition of the sublimation transfer ink set according to claim 2 to an intermediate transfer medium through an ink jet method; and
transferring each dye included in each of the ink compositions to a recoding medium by heating each of the ink compositions in a state where a surface of the intermediate transfer medium to which each ink composition is attached and a dyed surface of the recoding medium face each other.

7. A method of manufacturing a dyed product, comprising:
attaching each ink composition of the sublimation transfer ink set according to claim 3 to an intermediate transfer medium through an ink jet method; and
transferring each dye included in each of the ink compositions to a recoding medium by heating each of the ink compositions in a state where a surface of the intermediate transfer medium to which each ink composition is attached and a dyed surface of the recoding medium face each other.

8. A method of manufacturing a dyed product, comprising:
attaching each ink composition of the sublimation transfer ink set according to claim 4 to an intermediate transfer medium through an ink jet method; and
transferring each dye included in each of the ink compositions to a recoding medium by heating each of the ink compositions in a state where a surface of the intermediate transfer medium to which each ink composition is attached and a dyed surface of the recoding medium face each other.

9. A dyed product which obtained by using a sublimation transfer ink set according to claim 1.

10. A dyed product which obtained by using a sublimation transfer ink set according to claim 2.

11. A dyed product which obtained by using a sublimation transfer ink set according to claim 3.

12. A dyed product which obtained by using a sublimation transfer ink set according to claim 4.

* * * * *